P. J. GARRISON.
DRIVING MECHANISM FOR VEHICLES.
APPLICATION FILED JAN. 8, 1919.
1,318,372.
Patented Oct. 14, 1919.
2 SHEETS—SHEET 1.
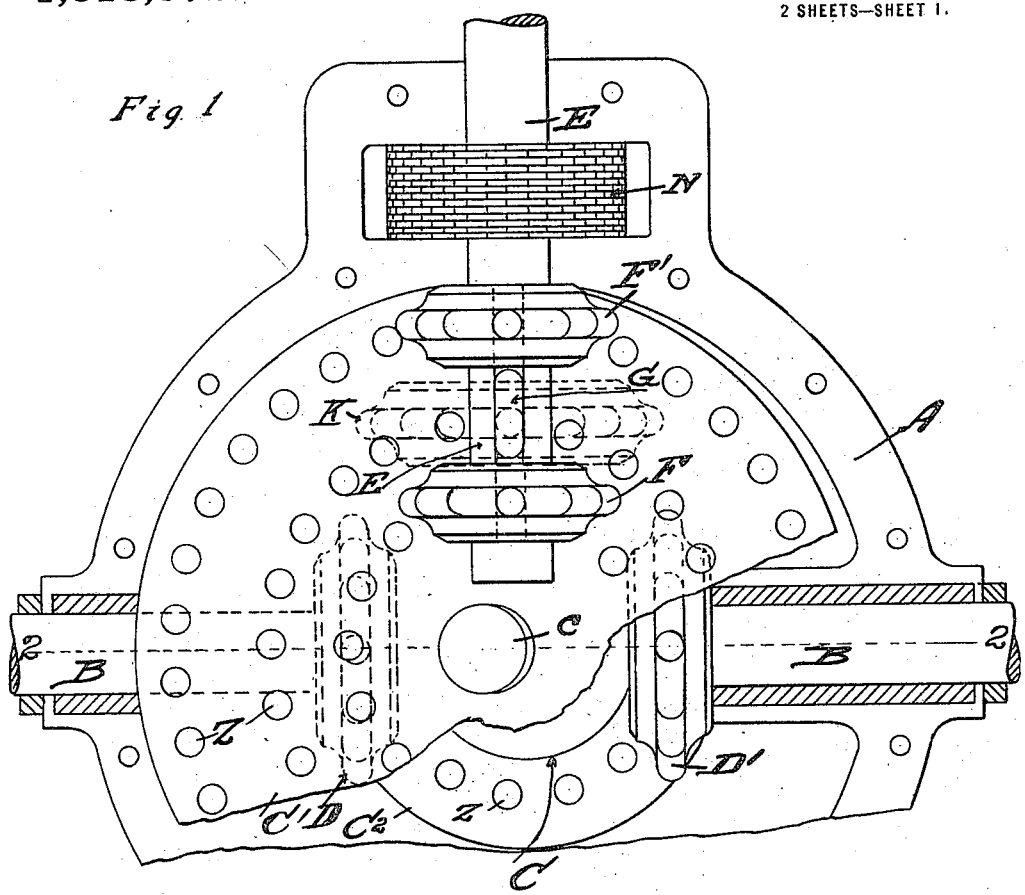
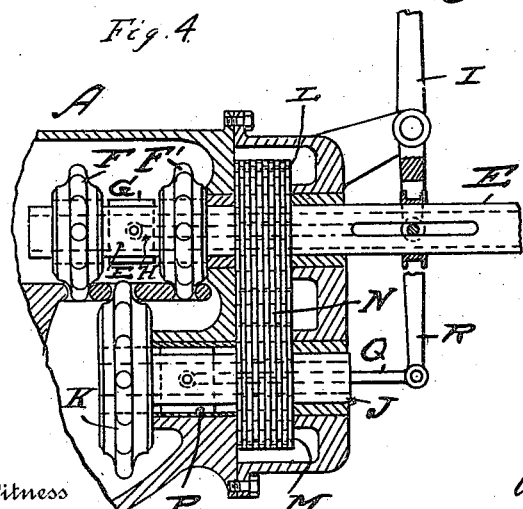
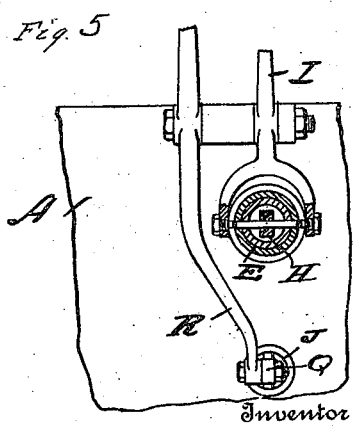
Inventor
Perry J. Garrison
By J. S. Thomas
Attorney
Witness
L. S. Woodl.

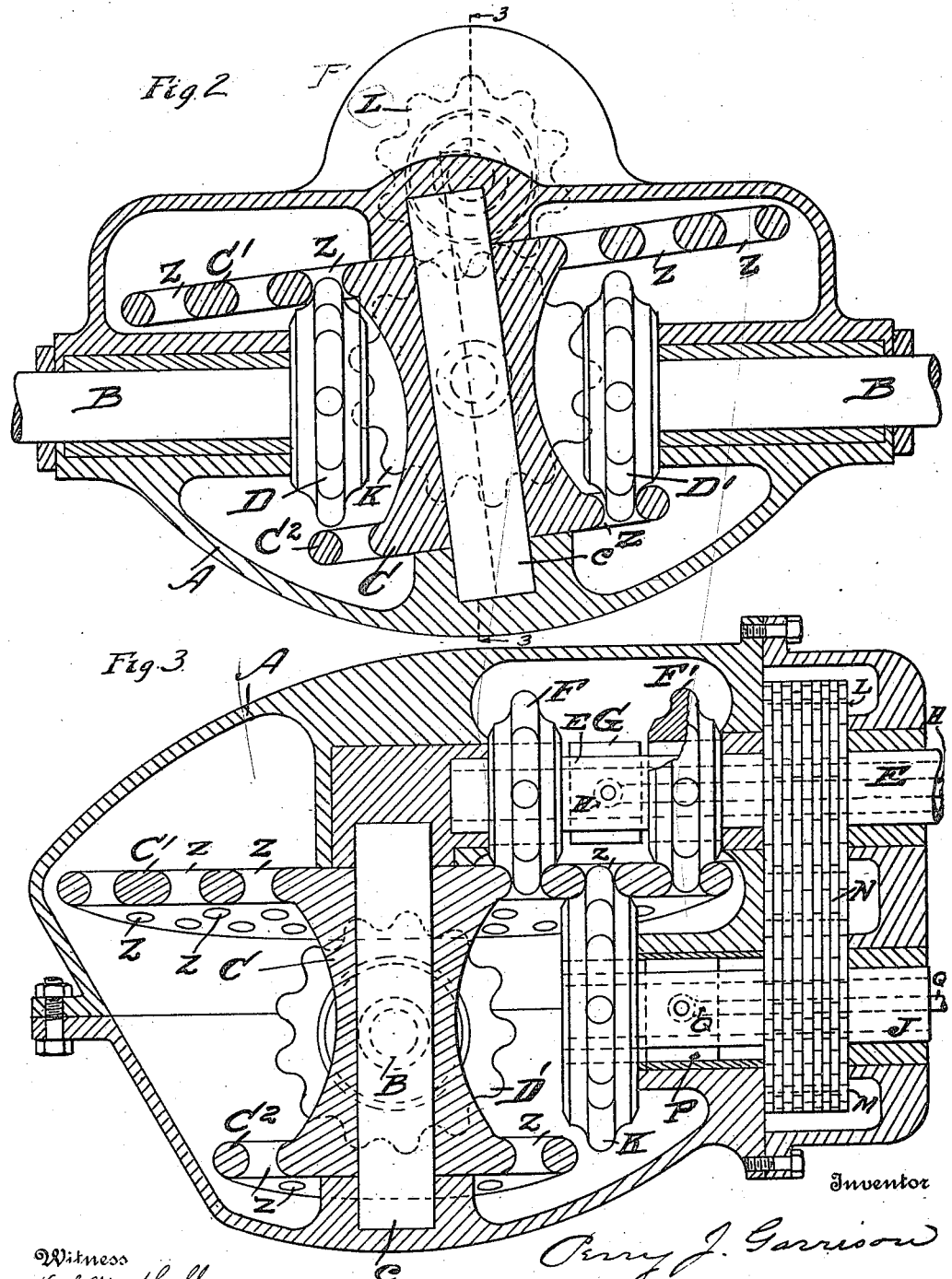

UNITED STATES PATENT OFFICE.

PERRY J. GARRISON, OF OXFORD, MICHIGAN, ASSIGNOR OF ONE-HALF TO WILLIAM REED, OF OXFORD, MICHIGAN.

DRIVING MECHANISM FOR VEHICLES.

1,318,372.  Specification of Letters Patent.  Patented Oct. 14, 1919.

Application filed January 8, 1919. Serial No. 270,127.

*To all whom it may concern:*

Be it known that I, PERRY J. GARRISON, citizen of the United States, residing at Oxford, county of Oakland, State of Michigan, have invented a certain new and useful Improvement in Driving Mechanism for Vehicles, and declare the following to be a full, clear, and exact description of the same, such as will enable others skilled in the art to which it pertains to make and use the same, reference being had to the accompanying drawings, which form a part of this specification.

My invention relates to a driving mechanism for vehicles, and is particularly designed for use upon trucks or other vehicles of a like character.

The object of this invention is to provide a simple, strong, efficient and inexpensive driving connection between a prime mover, and the rear axle of a motor driven vehicle, being especially designed for heavy duty purposes.

With the foregoing, and other objects in view—my invention resides in the combination and arrangement of parts,—described and claimed in the following specification:— it being understood, however, that changes may be made in the precise embodiment of the invention hereby disclosed without departing from the spirit of the same.

In the accompanying drawings:—

Figure 1 is a plan view of the gear case with the cover removed and parts broken away;—showing also in connection therewith, a fragment of the divided rear axle of a motor vehicle.

Fig. 2 is a vertical cross-sectional view of the gear case on line 2—2 of Fig. 1. Fig. 3 is a vertical sectional view on line 3—3 of Fig. 2. Fig. 4 is a fragmentary sectional view on a reduced scale, showing the lever mechanism for operating the clutches connecting the pinions with the driving and driven shafts.

Fig. 5 is a fragmentary elevation with parts in section showing the manually operated levers for controlling the clutches.

A divided rear axle has been shown in the drawings, and while a suitable so called "differential" mechanism may be employed, none has been shown, as this feature forms no part of the present invention.

Referring now to the letters of reference placed upon the drawings:—

A, denotes a gear case divided substantially on the line of the rear axle of a motor vehicle. B, is the divided rear axle of a motor vehicle (not shown);—its opposing ends being journaled in the case. C, is a rotatable member carried by an angularly disposed shaft $c$ supported in the walls of the case.

The member C, is provided with projecting flanges $C^1$ and $C^2$, spaced apart of relatively different diameters;—preferably integral therewith, and with a plurality of apertures to receive the teeth of certain driving pinions, hereafter more fully described.

D and $D^1$ are pinions mounted upon the ends of the divided axle, the teeth of which are respectively adapted to enter a row of the apertures Z, in the flanges of the member C:—the teeth of the pinion D, entering the apertures in the flange $C^1$, from below, while the teeth of the pinion $D^1$, enters the apertures in the flange $C^2$, from above the latter.

E, denotes a hollow driving shaft actuated in the usual manner by a prime mover (not shown). F, is a pinion loosely mounted upon the shaft E, but adapted to be keyed or "clutched" thereto,—the teeth of which enter one of the circular rows of apertures Z, in the flange $C^1$.

$F^1$, is a similar pinion also loosely mounted upon the shaft E,—but adapted to be keyed to rotate therewith,—the teeth of which enter a concentric row of apertures Z, in the flange $C^1$.

G, is a clutch or key member, extending transversely through an elongated slot in the shaft E;—adapted to be alternately shifted by means of a rod H,—in turn operably connected with a manually actuated lever I, whereby the pinions F and $F^1$ may be alternately locked to the shaft E, that the rotatable member C, may be driven at different speeds. The member G, may also be shifted to occupy a "neutral" position,—as shown in Fig. 3, in order that the traction wheels of the vehicle may not be operated.

J, is a hollow stub shaft, journaled in the wall of the gear case below the flange $C^1$, of the rotatable member. K, is a pinion loosely sleeved upon the shaft J, the teeth of which enter one of the rows of apertures in the flange $C^1$, of the rotatable member.

L and M, are sprocket gears, respectively mounted upon the shafts E and J, and are connected together by a driving chain N, to impart motion to the latter shaft. P, is a sliding key or clutch,—manually actuated through a rod Q, in turn operably connected with a lever R, to secure the pinion K, in driving relation to the shaft J,—whereby a reverse motion may be given to the member C, and the traction wheels of the vehicle.

Having indicated the several parts by reference letters, the construction and operation of the device will now be readily understood.

To operate the traction or driving wheels (not shown) carried by the divided axle in a forward direction, the lever I, is manually operated to shift the clutch member G, from its neutral position (shown in Fig. 3) so as to "clutch" either the pinion F, or F′, to the shaft E, in accordance with the speed required. The member C, is thus actuated and the pinions D and D′, mounted upon the inner ends of the divided axle, are thereby operated, rotating the rear axle with its traction wheels in a forward direction. When it is desired to reverse the direction taken by the vehicle, the clutch member G, is thrown into a "neutral" position, by the operation of the lever I, the clutch lever R, is then operated to shift the clutch member P, into engagement with the pinion K, thereby locking it to the shaft J. Power having now been applied to the shaft J, through the driving chain connection N with the shaft E, the member C is rotated in a reverse direction, thereby reversing the rotation of the rear axle and the traction wheels mounted thereon.

It will be seen that by the use of this invention there is no shifting of gears,—that the driving gears are always in mesh, and that the operation of the device is both simple and very effective.

Having thus described my invention, what I claim is:—

1. In a driving mechanism, the combination of a gear case; a divided axle, the opposing ends of which extend into the gear case; a rotatable member journaled in the gear case, having flange portions spaced apart, and provided with a plurality of circularly arranged apertures; a gear mounted upon each portion of the divided axle, the teeth of which respectively enter the apertures in the upper and lower flanges of the rotatable member; a driving shaft; gears loosely mounted upon the driving shaft, their teeth entering the apertures in the rotatable member; and means for alternately clutching said last named gears to the driving shaft, whereby the axle may be rotated at different speeds.

2. In a driving mechanism, the combination of a gear case; a divided axle, its opposing ends extending into the gear case; an angularly disposed stub shaft supported in the walls of the case; a rotatable member mounted upon the stub shaft, having projecting flanges spaced apart and provided with a plurality of holes, arranged in circular form, a gear mounted upon each portion of the divided axle, the teeth of which respectively enter apertures in the upper and lower flanges of the rotatable member; a driving shaft; gears loosely mounted upon the driving shaft, the teeth of the respective gears entering different rows of apertures in the rotatable member; and means for alternately clutching said gears to the driving shaft, whereby the axle may be driven at different speeds.

3. In a driving mechanism, the combination of a gear case; a divided axle, its opposing ends extending into the gear case; an angularly disposed rotatable member journaled in the case, having flanges spaced apart and provided with a plurality of holes arranged in circles; a gear mounted upon each portion of the divided axle, the teeth of which respectively enter the apertures in the upper and lower flanges of the rotatable member; a driving shaft; a driven shaft; means for actuating the driven shaft from the driving shaft; gears loosely carried by both the driving and driven shafts, the teeth of which enter rows of apertures in the rotatable member to actuate the axle in a forward or reverse direction; and means for alternately clutching said gears to the driving or driven shafts.

In testimony whereof I sign this specification in the presence of two witnesses.

PERRY J. GARRISON.

Witnesses:
S. E. THOMAS,
JOHN CONSIDINE, Jr.